United States Patent Office 3,466,292
Patented Sept. 9, 1969

3,466,292
DIAZATRICYCLODODECANEDIONES AND
DIAZATRICYCLODODECADIENDIONES
Leo A. Paquette, Kalamazoo County, Mich., assignor to
The Upjohn Company, Kalamazoo, Mich., a corporation of Delaware
No Drawing. Original application July 16, 1962, Ser. No.
210,195. Divided and this application May 13, 1966,
Ser. No. 590,443
Int. Cl. C07d 29/28
U.S. Cl. 260—294
8 Claims

ABSTRACT OF THE DISCLOSURE

This invention relates to novel compositions of matter and to methods for their preparation and is particularly directed to certain diazatricyclododecane diones having the following formula:

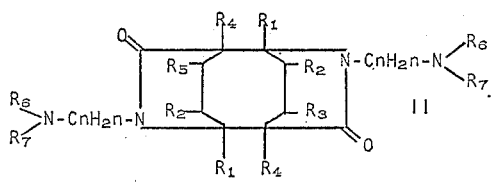

and to the corresponding diazatricyclododecadiendiones.

This is a division of application Ser. No. 210,195, filed July 16, 1962, now U.S. Patent No. 3,321,482.

BRIEF DESCRIPTION OF THE INVENTION

The novel diazatricyclododeconediones and diazatricyclododecanediendiones are represented by the following structural formula:

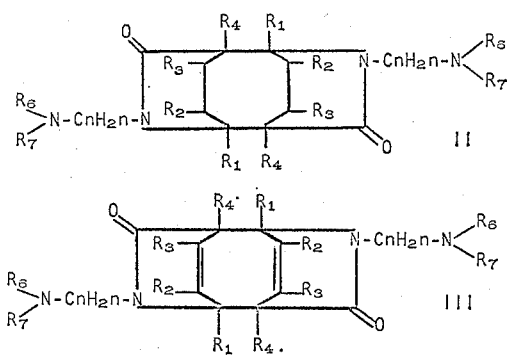

wherein $R_1$ is hydrogen, methyl, or ethyl; $R_2$ is hydrogen, methyl, or ethyl; $R_3$ is hydrogen, methyl, or ethyl; $R_4$ is hydrogen, methyl, or ethyl; $n$ is an integer from 1 to 6, inclusive, and $R_6$ and $R_7$ are lower-alkyl or lower-alkyl linked together to form a five to nine membered saturated heterocycle by methylene, sulfur, or oxygen. Examples of lower-alkyl are methyl, ethyl, propyl, butyl, pentyl, hexyl, heptyl, and octyl, and the isomeric forms thereof and examples of saturated heterocycles are piperidino, morpholino, thiamorpholino, piperazino, pyrrolidino, hexamethyleneimino, heptamethyleneimino, octamethyleneimino, homomorpholino, 2-methylhexamethyleneimino, 2,2-dibutylhexamethyleneimino, 3,6 - dimethylhexamethyleneimino, 2-ethylmorpholino, 2 - ethyl-5-methylmorpholino, 3,3-dimethylmorpholino, 3-methylthiamorpholino, 2,3,5,6-tetramethylthiamorpholino, 2,3,6-trimethylthiamorpholino, 4-butylpiperazino, 4 - isopropylpiperazino, 2,2,4,5,5 - pentamethylpiperazino, 2,5 - diisobutylpiperazino, 2,4,5-trimethylpiperazino, 2-methylpiperidino, 3-methylpiperidino, 4-methylpiperidino, 2-butylpiperidino, 2-propylpiperidino, 4-isopropylpiperidino, 3,4 - diethylpiperidino, 2-sec-butylpyrrolidino, 2,2-dimethylpyrrolidino, 2-ethylpyrrolidino, 2,4-dimethylpyrrolidino, 2-isopropylpyrrolidino, or hexahydro-3-isopropylpyrimidino. Examples of —$C_nH_{2n}$— are

—$CH_2$—, —$(CH_2)_2$—, —$(CH_2)_3$—, —$(CH_2)_4$—
—$(CH_2)_5$—, —$(CH_2)_6$—

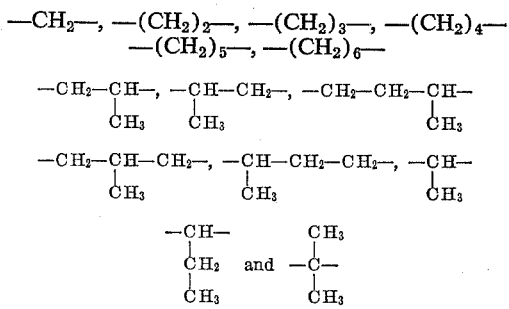

DETAILED DESCRIPTION

On reduction with lithium aluminum hydride the diazatricyclododecanediones of the invention are reduced to the corresponding diazatricyclododecanes which are nitrogenous bases and as such can exist in both the protonated and nonprotonated form according to the pH of the environment. The nonprotonated form can be oxidized, with hydrogen peroxide for example, to form N-oxide. The N-oxide also can exist in both the protonated and nonprotonated form according to the pH of the environment. The protonated forms can be isolated as acid addition salts which are useful for upgrading the free base and free base N-oxide forms, i.e., the nonprotonated forms. Suitable acids for this purpose are hydrochloric acid, sulfuric acid, phosphoric acid, thiocyanic acid, fluosilicic acid, picric acid, Reinecke's acid, azobenzenesulfonic acid, and the like. The acid addition salt can be formed by neutralizing the free base or free base N-oxide with the appropriate acid or by metathesis of a simple acid addition salt such as the hydrochloride or sulfate with another salt of the desired acid.

The diazatricyclododecanes are useful intermediates. Thus the condensation products obtained from the thiocyanic acid addition salts and formaldehyde according to U.S. Patents 2,425,320 and 2,606,155 are useful as pickling inhibitors, and the fluosilicic acid addition salts are useful as mothproofing agents according to U.S. Patents 1,915,334 and 2,075,359.

The diazatricyclododecanes can also exist in the form of quaternary ammonium salts, such for example, as those obtained by coordinating the free base form with a lower-alkyl halide, for example, methyl, ethyl, propyl, butyl, pentyl, hexyl, heptyl, and octyl chloride, including the isomers thereof. The quaternary ammonium salts are useful for forming the corresponding fluosilicic acid salts which are useful as mothproofing agents. These fluosilicic acid salts can be formed by metathesis with an inorganic fluosilicate or by springing the quaternary ammonium hydroxide (by treating the salt with an equivalent of base, e.g., NaOH) and neutralizing it with fluosilicic acid.

The compounds of the invention can be prepared by hydrogenating with hydrogen in an organic solvent, for example, acetic acid or a lower-alkanol in the presence of a catalyst effective to saturate olefinic double bonds, for example, platinum or palladium oxides, the corresponding diazacyclododecadiendione (Formula III) which in turn can be prepared by the photodimerization of a 2-pyridone having the formula:

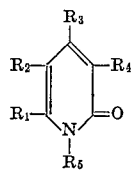

wherein $R_5$ is the radical

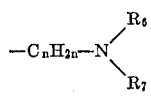

and $n$, $R_1$, $R_2$, $R_3$, $R_4$ $R_6$, and $R_7$ are as given above. The photodimerization is advantageously effected in aqueous solution at room temperature (24 to 30° C.) because of the ease with which the dimers can be isolated. For the more insoluble 2-pyridones, an organic solvent, for example, ethanol or other lower-alkanol, benzene, toluene, hexane, chloroform, carbon tetrachloride, diethyl ether or other di-lower-alkyl ethers, and the like, can be used. Higher or lower temperatures, say from about 0 to 75 degrees centigrade can be used. The light source can be any ultraviolet lamp, filtered or unfiltered, giving off radiations in the range of about 240 to 260 millimicrons.

The diazatricyclododecanediones and diazatricyclododecanediendiones of Formulas II and III also exist in the protonated and non-protonated forms according to the pH of the environment and form N-oxides on oxidation with hydrogen peroxide which also exist in the protonated or non-protonated forms according to the pH of the environment. The protonated forms can be isolated as acid addition salts, for example with the acids given above, which salts are useful for upgrading the free base or free base N-oxide forms or for forming the corresponding thiocyanate and fluosilicate salt which are useful for forming pickling inhibitors or as mothproofing agents according to the U.S. Patents noted above.

The starting compounds IV can be prepared by alkylating 2-pyridone by the procedure of Rath [Ann. 489, 107(1931)], according to the following equation:

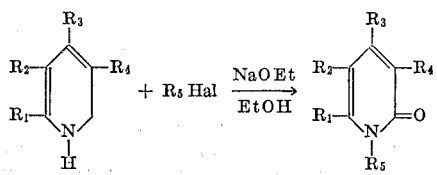

wherein Hal is halogen, e.g., chlorine, bromine, or iodine, and $R_1$, $R_2$, $R_3$, $R_4$, and $R_5$ are as given above. Alternatively they can be prepared by alkylating pyridine and oxidizing with alkali metal ferricyanide by the procedure of U.S. Patent 1,941,312 according to the following equations:

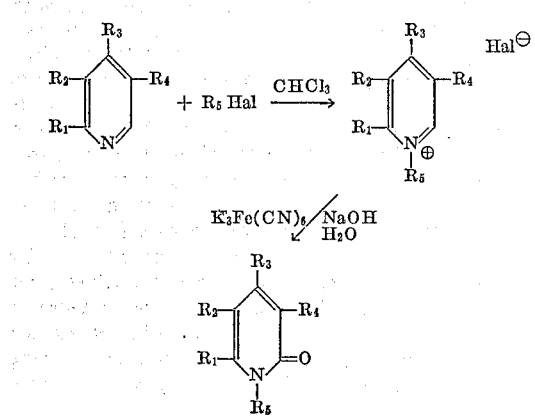

wherein Hal and $R_1$, $R_2$, $R_3$, $R_4$, and $R_5$ are as given above. Another procedure that can be used is that of Bradlow and Vanderwerf [J. Org. Chem., 16, 73 (1951)] according to the following equations:

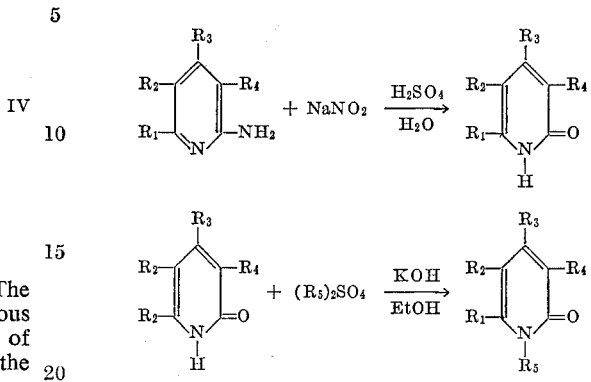

wherein $R_1$, $R_2$, $R_3$, $R_4$, and $R_5$ are as given above.

The invention can now be more fully understood by reference to the following examples which are given by way of illustration and in which parts and percentages are by weight unless otherwise specified.

EXAMPLE $R_5$=2-diethylaminoethyl (A) 1-(2-diethylaminoethyl)pyridinium chloride hydrochloride:

This substance was prepared by the method of K. Miescher and E. Urech, U.S. Patent 1,941,312 (Dec. 26, 1933) and was obtained as a hygroscopic white solid (from ethanol), M.P. 221–223° (gas evol.).

(B) 1-(2-diethylaminoethyl)-2(1H)-pyridone:

A solution of 241.5 g. (0.962 mole) of 1-(2-diethylaminoethyl)pyridinium chloride hydrochloride of Part A in 300 ml. of water was treated with 500 ml. of benzene. To this rapidly stirred mixture cooled in an ice-methanol bath was added concomitantly a solution of 154 g. (3.85 moles) of sodium hydroxide in 250 ml. of water and one-half of a solution of 627 g. (1.91 moles) of potassium ferricyanide in 1.5 liters of water at such a rate that the temperature did not exceed 20°. An additional liter of benzene was added, followed by the addition of the remaining ferricyanide solution. The mixture was stirred for 2 hrs. at room temperature. The benzene layer was separated and the aqueous phase was extracted with three one-liter portions of chloroform. The combined organic layers were dried, filtered and evaporated to give a tan liquid, which was distilled in vacuo to give 135 g. (72.6%) of colorless 1-(2-diethylaminoethyl)-1,2-(1H)-pyridone, B.P. 100–102° (0.05–0.075 mm.), $n_D^{25}$ 1.5232. Vapor phase chromatography indicated that this material was about 98% pure.

(C) 3,7 - bis(2 - diethylaminoethyl)-3,7-diazatricyclo-[4.2.2.2$^{2,5}$]dodeca-9,11-diene-4,8-dione:

A solution of 48.6 g. (0.25 mole) of 1-(2-diethylaminoethyl)-2(1H)-pyridone of Part B in 300 ml. of water was irradiated for 16 hrs. at 25° with a 200 watt unfiltered mercury vapor ultraviolet lamp. The precipitated white solid was filtered and dried to afford 5.7 g. (11.7%) of dimer, 3,7-bis(2-diethylaminoethyl)-3,7-diazatricyclo[4.2.2.2$^{2,5}$]dodeca-9,11-diene-4,8-dione, M.P. 194–195°. This material was recrystallized from benzene-hexane to produce pure product, M.P. 196–197°.

Analysis.—Calcd. for $C_{22}H_{30}N_4O_2$: C, 68.00; H, 9.34; N, 14.42. Found: C, 68.00; H, 9.21; N, 14.20. M.W. Calcd. 388; Found: 377.

In tests for pharmacodynamic activity this compound displayed antiinflammatory activity and anti-pseudocholinesterase activity.

(D) [(4,8 - dioxo - 3,7-diazatricyclo[4.2.2.2²,⁵]dodeca-9,11 - diene - 3,7-diyl)diethylene]bis[diethylmethylammonium]iodide:

To a solution of 3.0 g. (7.73 mmoles) of the dimer of Part C in 30 ml. of ethanol was added 15 ml. of methyl iodide and the solution was refluxed for 1 hr. A solid rapidly separated as the reaction proceeded. The cooled mixture was treated with ether, the white solid was filtered and washed thoroughly with ether. The dried product weighed 5.17 g. (99.8%); M.P. 235–236°. Pure compound was obtained as fine white crystals from 80% aqueous ethanol-ether, M.P. 235–236°.

*Analysis.*—Calcd. for $C_{24}H_{42}I_2N_4O_2$: C, 42.86; H, 6.30; N, 8.33. Found: C, 42.73; H, 6.40; N, 8.19.

In tests for pharmacodynamic activity in mice this compound displayed sedative activity.

(E) 3,7 - bis(2 - diethylaminoethyl)-3,7-diazatricyclo-[4.2.2.2²,⁵]dodecane-4,8-dione:

A solution of 5.5 g. (0.0141 mole) of the dimer of Part C in 150 ml. of absolute ethanol containing 250 mg. of platinum oxide was hydrogenated in a Parr apparatus. Hydrogen uptake was complete after 0.5 hr. (102% of theory). The catalyst was filtered, the filtrate evaporated under reduced pressure and the residue thoroughly dried. There was obtained 5.5 g. (100% of 3,7-bis(2-diethylaminoethyl)-3,7-diazatricyclo[4.2.2.2²,⁵]dodecane-4,8-dione, M.P. 181–184°. The analytical sample was produced by recrystallization of this material from benzene-hexane, shiny white platelets, M.P. 183–184.5°.

*Analysis.*—Calcd. for $C_{22}H_{40}N_4O_2$: C, 67.30; H, 10.27; N, 14.27. Found: C, 67.29; H, 10.10; N, 14.12.

In tests for pharmacodynamic activity in mice, this compound displayed antipseudocholinesterase activity.

(F) [4,8 - dioxo-3,7-diazatricyclo[4.2.2.2²,⁵]dodecane-3,7-diyl)diethylene]bis-[diethylmethylammonium]iodide:

A solution of 3.0 g. (7.73 mmoles) of the tetrahydrodimer of Part E in 30 ml. of absolute ethanol was treated with methyl iodide (15 ml.) as above. There was obtained 5.15 g. (99.2%) of an off-white solid, M.P. 268° (foaming). Recrystallization of this material from 90% aqueous ethanol-ether gave pure diiodide as small off-white crystals, M.P. 268° (foaming).

*Analysis.*—Calcd. for $C_{24}H_{40}I_2N_4O_2$: C, 42.61; H, 6.85; N, 8.28. Found: C, 42.44; H, 6.88; N, 7.93.

In tests for pharmacodynamic activity in mice, this compound displayed antipseudocholinesterase activity and antiinflammatory activity.

(G) 3,7 - bis(2 - diethylaminoethyl) - 3,7-diazatricyclo-[4.2.2.2²,⁵]dodecane tetrahydrochloride:

A solution of 6.4 g. (0.0163 mole) of the tetrahydrodimer of Part E in 75 ml. of dry, purified tetrahydrofuran was added drop-wise to a slurry of 1.90 g. (0.050 mole) of lithium aluminum hydride in 50 ml. of the same solvent. The stirred mixture was refluxed for 2 hrs. and was decomposed while cooled in an ice-water bath with 2 ml. of water, 6 ml. of 30% sodium hydroxide solution and 2 ml. of water, in that order. The precipitated salts were filtered and washed well with ether. The filtrates were combined and evaporated to give a colorless oil which was directly converted to its tetrahydrochloride with ethereal hydrogen chloride. The white solid was filtered, and thoroughly dried to give 8.25 g. (99.0%) of 3,7 - bis(2-diethylaminoethyl)-3,7-diazatricyclo[4.2.2.2²,⁵] dodecane tetrahydrochloride, M.P. 268–270° (dec.). Pure tetrahydrochloride was obtained as white crystals, M.P. 274° (dec.).

*Analysis.*—Calcd. for $C_{22}H_{40}Cl_4N_4$: C, 51.76; H, 9.48; N, 10.98. Found: C, 51.69; H, 9.48; N, 10.92. Equiv. wt. Calcd. 127.6. Found: 128.5.

In tests for pharmacodynamic activity in mice, this compound displayed CNS stimulant activity, antiinflammatory activity, antiappetite activity, and cholesterol-lowering activity.

By substituting the 2-diethylaminoethyl chloride in the above example by the appropriate $R_3Cl.HCl$, for example, where $R_3$ is dimethylaminomethyl, 2-dimethylaminoethyl,
1-dimethylaminoethyl,
1-methyl-2-dimethylaminoethyl,
2-dimethylaminopropyl,
3-dimethylaminopropyl,
4-dimethylaminobutyl,
1-methyl-1,3-dimethylaminopropyl,
2-methyl-3-dimethylaminopropyl,
3-dimethylaminobutyl,
5-dimethylaminopentyl,
6-dimethylaminohexyl,
diisopropylaminomethyl,
2-diisopropylaminoethyl,
2-(N-methyl-N-isopropylamino)ethyl,
2-piperidinoethyl,
2-morpholinoethyl,
2-thiamorpholinoethyl,
2-piperazinoethyl,
2-pyrrolidinoethyl,
2-hexamethyleneiminoethyl,
2-heptamethyleneiminoethyl,
2-octamethyleneiminoethyl,
2-homomorpholinoethyl,
2-(2-methylhexamethyleneimino)ethyl,
2-(2,2-dibutylhexamethyleneimino)ethyl,
2-(3,6-dimethylhexamethyleneimino)ethyl,
2-(2-ethylmorpoholino)ethyl,
2-(2-ethyl-5-methylmorpholino)ethyl,
2-(3,3-dimethylmorpholino)ethyl,
2-(3-methylthiamorpholino)ethyl,
2-(2,3,5,6-tetramethylthiamorpholino)ethyl,
2-(2,3,6-trimethylthiamorpohlino)ethyl,
2-(4-butylpiperazino)ethyl,
2-(4-isopropylpiperazino)ethyl,
2-(2,2,4,5,5-pentamethylpiperazino)ethyl,
2-(2,5-diisobutylpiperazino)ethyl,
2-(2,4,5-trimethylpiperazino)ethyl,
2-(2-methylpiperidino)ethyl,
2-(3-methylpiperidino)ethyl,
2-(4-methylpiperidino)ethyl,
2-(2-butylpiperidino)ethyl,
2-(2-propylpiperidino)ethyl,
2-(4-isopropylpiperidino)ethyl,
2-(3,4-diethylpiperidino)ethyl,
2-(2-sec-butylpyrrolidino)ethyl,
2-(2,2-dimethylpyrrolidino)ethyl,
2-(2-ethylpyrrolidino)ethyl,
2-(2,4-dimethylpyrrolidino)ethyl,
2-(2-isopropylpyrrolidino)ethyl and
2-(hexahydro-3-isopropylpyrimidino)ethyl, there are obtained the corresponding 3.7-bis($R_5$)-3,7-diazatricyclo[4.2.2.2²,⁵]dodeca - 9,11 - diene - 4,8 - diones, 3,7 - bis($R_5$) - 3,7 - diazatricyclo[4.2.2.2²,⁵]dodecane-4,8-diones, and 3,7 - bis($R_5$) - 3,7-diazatricyclo[4.2.2.2²,⁵]-dodecanes.

By substituting the 2-pyridone in the above example by other pyridones of the formula:

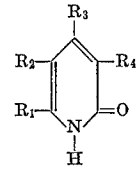

for example, wherein $R_1$ is methyl or ethyl and $R_2$, $R_3$, and $R_4$ are hydrogen; $R_2$ is methyl or ethyl, and $R_1$, $R_3$, and $R_4$ are hydrogen; $R_3$ is methyl or ethyl and $R_1$, $R_2$, and $R_4$ are hydrogen; $R_4$ is methyl or ethyl and $R_1$, $R_2$, and $R_3$ are hydrogen; or where $R_1$, $R_2$, $R_3$, and $R_4$ are methyl or ethyl, the corresponding 3,7-bis($R_5$)-2,6- di($R_1$)-; 3,7 - bis($R_5$) - 10,12-di($R_1$)-; 3,7-bis($R_5$)-9,11-di-($R_1$)-; 3,7-bis($R_5$)-1,5-di($R_5$)-; and 3,7-bis($R_5$)-1,2,5,6,9,10,11,12 - octa($R_5$) - 3,7-diazatricyclo[4.2.2.2$^{2,5}$]dodeca-9,11 - diene - 4.8 - diones; dodecane-4,8-diones, and dodecanes wherein $R_5$ is diethylaminoethyl or any of the other ominoalkyl groups listed above and

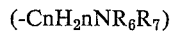

$R_1$ is methyl or ethyl.

All of the above compounds, except those having methyl or ethyl substitutes in the two and six positions have point symmetry.

I claim:

1. A compound of the formula:

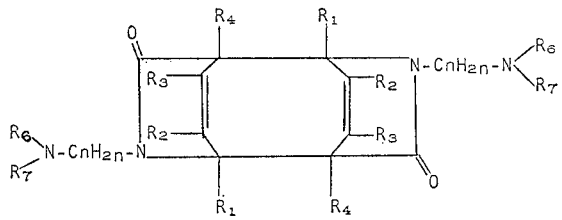

wherein $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, and ethyl; $R_4$ is selected from the group consisting of hydrogen, methyl, and ethyl; $n$ is an integer from 1 to 6; and

is diloweralkylamino, piperidino, morpholino, thiamorpholino, piperazino, pyrrolidino hexamethyleneimino, heptamethyleneimino, octamethyleneimino, homomorpholino, 2-methylhexamethyleneimino, 2,2-dibutylhexamethyleneimino, 3,6-dimethylhexamethyleneimino, 2-ethylmorpholino, 2 - ethyl -5 - methylmorpholino, 3,3-dimethlymorpholino, 3 - methylthiamohpholine, 2,3,5,6-tetramethylthiamorpholino, 2,3,6 - trimethylthiamorpholino, 4-butylpiperazino, 4-isopropylpiperazino, 2,2,4,5,5-pentamethylpiperazino, 2,5 - diisobutylpiperazino, 2,4,5-trimethylpiperazino, 2-methylpiperidino, 3-methylpiperidino, 4 - methylpiperidino, 2 - butylpiperidino, 2-propylpiperidino, 4-isopropylpiperidino, 3,4-diethyleridino, 2-sec-butylprroldino, 2,2-dimethylpyrrolidino, 2-ethylpyrrolidino, 2,4-dimethylpyrrolidino, 2-isopropylpyrrolidino, or hexahydro-3-isopropylpyrimindo, and the acid addition salts, N-oxides and N-oxide acid addition salts, and the lower-alkyl quaternary ammonium salts.

2. A compound of Formula II wherein $n$, $R_1$, $R_2$, $R_3$, and $R_4$ and the group —$NR_6R_7$ are as designated in claim 3 [and the group —$NR_6R_7$ is selected from the group consisting of diloweralkylamino, piperidino, morpholino, thiamorpholino, piperazino, pyrrolidino, hexamethyleneimino, heptamethyleneimino, octamethyleneimino, homomorpholine, 2-methylhexamethyleneimino, 2,2-dibutylhexamethyleneimino, 3,6-dimethylhexamethyleneimino, 2 - ethylmorpholino, 2 - ethyl - 5 - methylmorpholino 3,3-dimethylmorpholino, 3-methylthiamorpholino, 2,3,5,6-tetramethylthiamorpholino, 2,3,6-trimethylthiamorpholino 4-butylpiperazino, 4-isopropylpiperazino, 2,2,4,5,5-pentamethylpiperazino, 2,5-diisobutylpiperazino, 2,4,5-trimethylpiperazino, 2-methylpiperidino, 3-methylpiperidino, 4-methylpiperidino, 2-butylpiperidino, 2-propylpiperidino, 4 - isopropylpiperidino, 3,4 - diethylpiperidino, 3,4-diethylpiperidino, 2-sec-butylpyrrolidino, 2-ethylpyrrolidino, 2,4-dimethylpyrrolidino, 2-isopropylpyrrolidino, and hexahydro-3-isopropylpyrimidinol].

3. 3,7 - bis(2 - diethylaminoethyl) - 3,7 - diazatricyclo-[4.2.2.2$^{2,5}$]dodecane-4,8-dione.

4. [(4,8 - dioxo - 3,7 - diazatricyclo[4.2.2.2$^{2,5}$]dodecane - 3,7-diyl)diethylene]bis-[diethylmethylammonium]-iodide.

5. A compound of the formula

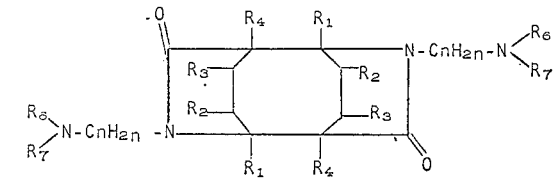

wherein $n$, $R_1$, $R_2$, $R_3$, $R_4$, $R_6$, and $R_7$ are as designated in claim 3, and the acid addition salts, N-oxides and N-oxide acid addition salts, and the lower-alkyl quaternary ammonium salts.

6. A compound of Formula III wherein $n$, $R_1$, $R_2$, $R_3$, $R_4$, and —$NR_6R_7$ are as designated in claim 3.

7. 3,7 - bis(2 - diethylaminoethyl) - 3,7 - diazatricyclo-[4.2.2.2$^{2,5}$]-dodeca-9,11-diene-4,8-dione.

8. [(4,8 - dioxo - 3,7 - diazatricyclo[4.2.2.2$^{2,5}$]dodeca-9,11 - diene - 3,7 - diyl)diethylene]bis-[diethylmethylammonium]iodide.

References Cited

UNITED STATES PATENTS

| | | | |
|---|---|---|---|
| 2,946,798 | 7/1960 | Rudner | 260—294.7 |
| 3,321,482 | 5/1967 | Paquette | 260—243 |

ALEX MAZEL, Primary Examiner

R. J. GALLAGHER, Assistant Examiner

U.S. Cl. X.R.

260—154, 156, 243, 247.2, 256.4, 268, 270, 293.4, 294.8, 295, 999

UNITED STATES PATENT OFFICE
CERTIFICATE OF CORRECTION

Patent No. 3,466,292                      Dated September 9, 1969

Inventor(s)   Leo A. Paquette

It is certified that error appears in the above-identified patent and that said Letters Patent are hereby corrected as shown below:

Column 3, lines 45-50, the formula should read

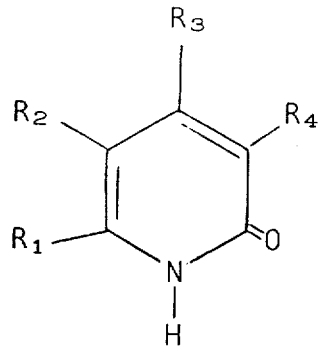

Column 4, line 70, change "$C_{22}H_{30}N_4O_2$" to read --$C_{22}H_{36}N_4O_2$--.
Column 5, line 44, change "$C_{24}H_{40}I_2N_4O_2$" to read --$C_{24}H_{46}I_2N_4O_2$--
line 66, change "as white" to read --as fine white--; line 69,
change "$C_{22}H_{40}Cl_4N_4$" to read --$C_{22}H_{48}Cl_4N_4$--.  Column 6, line 2,
change "$R_3Cl.HCl$" to read --$R_5Cl.HCl$--; line 3, change "$R_3$" to
read --$R_5$--.  Column 7, line 2, change "di($R_5$)-;" to read
--di($R_1$)-;--, line 3, change "octa($R_5$)" to read --octa($R_1$)--; li 3,466,292

Leo A. Paquette

September 9, 19

-2-

5, change "ominoalkyl" to read --aminoalkyl--; line 6, change "groups listed above and -(CnH₂nNR₆R₇)" to read --groups -(CnH₂nNR₆R₇) listed above and--; line 41, change "methly-morpholino," to read --methylmorpholino,--; line 41, change "3-methylthiamohpholine," to read --3-methylthiamorpholino,--; line 47, change "3,4-diethylieridino" to read --3,4-diethylpiperidino--; line 48, change "sec-butylprrolidino" to read --sec-butylpyrrolidino--; line 56, change "claim 3" to read --claim 1--; line 56, "[and the group -NR₆R₇ is selected from the" should be deleted. Column 8, lines 1-16 should be deleted line 38, change "claim 3" to read --claim 1--.

SIGNED AND

FEB 23 1971

(SEAL)
Attest:

Edward M. Fletcher, Jr.
Attesting Officer

WILLIAM E. SCHUYLER, J
Commissioner of Patent